Nov. 30, 1954  J. C. RUMSEY  2,695,792
PASSENGER PROTECTING CRASH PANEL FOR VEHICLE DASHBOARDS
Filed March 16, 1953
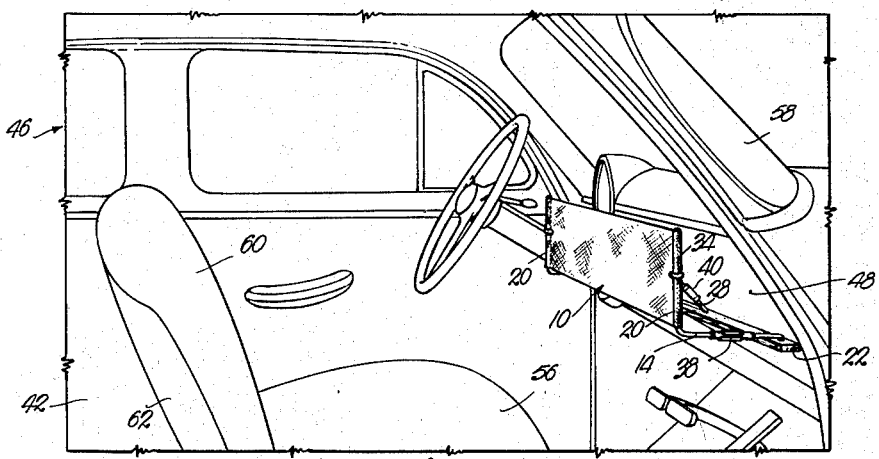
Fig. 1.
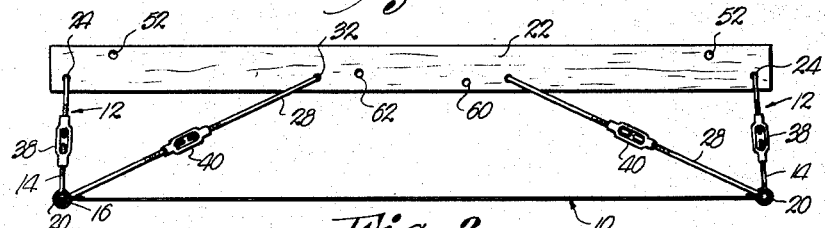
Fig. 2.
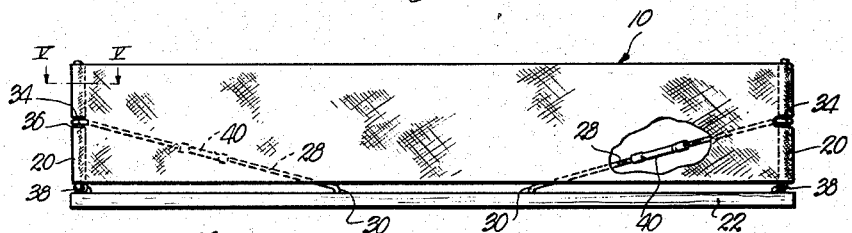
Fig. 3.
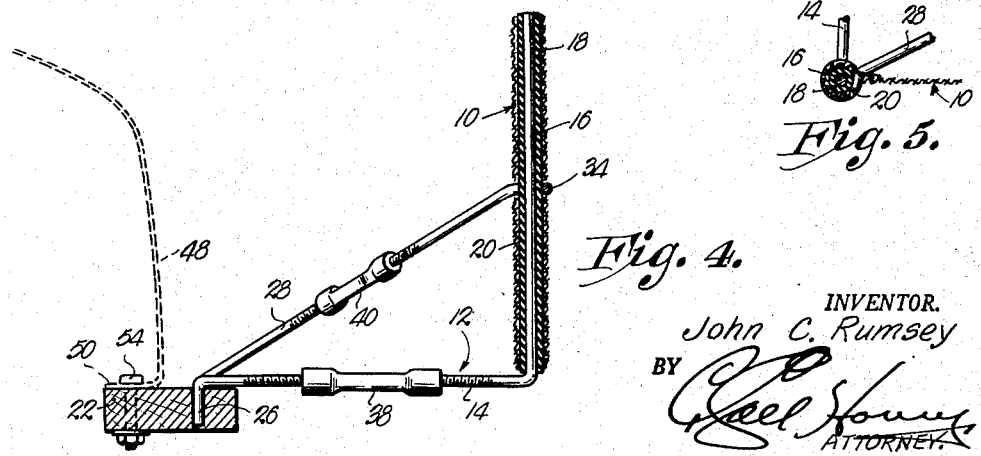
Fig. 4.
Fig. 5.
INVENTOR.
John C. Rumsey
BY
ATTORNEY.

United States Patent Office 2,695,792
Patented Nov. 30, 1954

2,695,792

PASSENGER PROTECTING CRASH PANEL FOR VEHICLE DASHBOARDS

John C. Rumsey, Lawrence, Kans.

Application March 16, 1953, Serial No. 342,488

4 Claims. (Cl. 280—150)

This invention relates to the field of safety in automotive vehicles, the primary object being to provide a shock absorber device that may be attached to the automobile body within the passenger compartment thereof, and so disposed to protect a passenger in the event of a crash.

It is the most important object of the present invention to provide a crash panel of flexible material having means for attaching the same to the dashboard or instrument panel of the automobile in spaced relation to such dashboard, all to the end that the passenger is thrown against the flexible shock absorbing panel rather than against a rigid part of the automobile in the event of a crash.

Another important aim of the invention is to provide a safety device of the aforementioned character having means forming a part thereof for holding the elongated flexible panel in a taut condition at all times and yet be so disposed as to not injure the passenger if a crash occurs.

A further object of the present invention is to provide a shock absorbing safety device wherein novel structure is included for mounting the entire assembly on the dashboard, yet in a position where the same will not interfere with normal use of the automobile.

Other objects include the way in which elongated rod-like elements are provided to hold the panel in a taut condition; the way in which the rod members are in turn provided with turnbuckles or like extensible means for not only adjusting the position of the panel, but for varying the extent of its tension; the way in which the panel is mounted for swinging movement to and from a position out of the way during non-use; and many more minor objects, all of which will be made clear or become apparent as the following specification progresses.

In the drawing:

Figure 1 is a perspective view of a protective device for automobiles made pursuant to my present invention, showing the same properly mounted within an automobile body on the dashboard thereof.

Fig. 2 is a top plan view thereof entirely removed from the automobile instrument panel.

Fig. 3 is a front elevational view, parts being broken away for clearness.

Fig. 4 is an enlarged, transverse, cross-sectional view through the panel of the safety device and through the dashboard of an automobile upon which the device is mounted; and Fig. 5 is a detailed, transverse, cross-sectional view taken on line V—V of Fig. 3.

It is common knowledge that in many automobile accidents the passenger who is most seriously injured is the one seated next to the driver because of the fact that he is thrown forwardly against the instrument panel, and oftentimes through the windshield.

Various safety devices have heretofore been proposed to protect the passenger, and, for the most part, the prior conceptions have taken the form of a crash pad of considerable thickness affixed directly to the instrument panel in front of the passenger. While pads of this character will obviously obviate some injury, they are not entirely satisfactory for the reason that the instrument panel and the windshield still present a rigid abutment against which the passenger is thrown. In accordance with the present invention, as will hereinafter appear, a safety device is provided which will absorb the shock as the passenger is thrown forwardly, by virtue of preventing contact with rigid parts of the automobile body.

The safety device as shown in the drawing consists essentially of an elongated flexible panel broadly designated by the numeral 10. Panel 10 may be made from any suitable material such as canvas or soft webbing, and must have as one of its essential characteristics a rather high degree of strength capable of standing the impact of a passenger thrown thereagainst during a crash or accident.

It is essential further to the present invention that the panel 10 be maintained in a taut condition at all times, at least longitudinally thereof. Accordingly, a pair of Z-shaped members broadly designated by the numeral 12 are provided as a primary support for the panel 10. Each of the members 12 includes an elongated leg 14 that is substantially horizontal, and an elongated upstanding post 16 integral therewith. Each post 16 is in turn padded, for the purpose of protecting the passenger, by means of an elongated, tubular covering 18 that may be made from rubber or other suitable, soft material. Transverse tubular portions 20 at each end respectively of the panel 10 are telescoped over the tubes 18.

The members 12 are each swingably mounted on an elongated bar 22 having openings 24 for receiving downturned ears 26 integral with horizontal legs 14. The posts 16 are braced, and the panel 10 is held longitudinally taut, by the provision of elongated arms 28 having downturned ears 30 swingable within openings 32 of the bar 22. The opposite ends of the arms 28 are provided with eyes 34 that encircle the tubular members 18 intermediate the ends thereof.

Panel 10 is provided with slots 36 for clearing the eyes 34 of the arms 28, and it is to be noted that the arms 28 angle upwardly and forwardly from their point of connection with the bar 22, leaving the panel 10 entirely clear throughout substantially its full length, all to the end that the panel 10 will absorb shocks without the passenger coming into contact with any rigid part of the automobile or of the device hereof.

Turnbuckles 38 and 40 are provided in the legs 14 and in the arms 28, respectively, as is clear in the drawing. Accordingly, the panel 10 may be tensioned longitudinally by adjusting the turnbuckles, particularly turnbuckles 30 within the brace arms 28 that interconnect the bar 22 and the posts 16.

Body 42 of automobile 46 is conventionally provided with an instrument panel or dashboard 48 which has in turn a horizontal, rearwardly-extending flange 50 forming a part thereof. The elongated bar 22 is adapted to lie directly beneath the horizontal flange 50 of the dashboard 48, as is clear in Fig. 4 of the drawing, and bar 22 is accordingly provided with a plurality of openings 52 for receiving bolts or other fastening elements 54. The bolts 54 pass through the flange 50, and thereby rigidly clamp the bar 22 to the dashboard 48.

The safety device hereof is disposed forwardly of the front passenger seat 56 of the automobile body 42, and it is to be particularly noted in Figs. 1 and 4 of the drawing that the panel 10 is held in spaced relationship to the instrument panel 48. Thus, when a passenger in the front seat alongside the driver of automobile 46 is thrown against the flexible panel 10, he will be protected from injury by virtue of being held out of contact with the instrument panel 48 or the windshield 58 of the automobile.

The distance between the panel 10 and the instrument panel 48 may be varied through manipulation of the two turnbuckles 38 in the horizontal legs 14, but for the most part, all that is needed is an assurance that the device will not interfere with normal operation of the automobile. The supporting means for the panel 10 holds the latter with its longitudinal axis horizontal and its transverse axis in a vertical position as shown, and, as before stated, the disposition of the various parts of the device for holding the panel 10 in a taut condition assures contact by the passenger involved in the crash with the panel 10 only.

It is contemplated that the panel 10 be disposed as shown in the drawing at all times, but if it should become desirable to swing the panel 10 out of the way, it is but necessary to remove the ear or projection 30 of the arms 28 from within the openings 32 of bar 22, whereupon the legs 14 of members 12 may be swung toward each other into overlying relationship to the bar 22. In the inoperative position, the downturned ear or projection 30 of the arm 28 shown at the left in Fig. 2 may thereupon be extended into an opening 60 in the bar 22. Similarly, the downturned ear or projection 30 of the arm 28 at the right in Fig. 2 of the drawing may be disposed within an opening 62 formed in the bar 22. In such collapsed condition the flexible panel 10 will readily fold out of the way against the instrument panel 48.

It is to be appreciated that the essential feature of the present invention lies in disposition of a flexible shock absorbing means in spaced relationship to the instrument panel or other upright structure forming a part of the automobile body within the passenger compartment thereof. It is manifest, therefore, that means other than that herein specifically shown may be provided to mount the panel 10 and hold it in a desired taut condition, and that the same may be supported forwardly of the rear seat (not shown) on the rearmost face 60 of the back rest 62 for front seat 56, and extending thereacross.

Having thus described the invention, what is claimed as new and desired to be secured by Letters Patent is:

1. In combination with a motor vehicle body having a passenger compartment including a seat and a dashboard spaced from the seat forwardly thereof, a shock absorbing safety device comprising an elongated bar; a pair of horizontal legs mounted on the bar and each having an upstanding post; an elongated, flexible, protective, crash panel interconnecting said posts, said panel having a horizontal longitudinal axis and a vertical transverse axis; an arm connecting each post respectively with the bar for holding the panel longitudinally taut; and means mounting said car on the dashboard with said panel disposed forwardly of the seat and spaced from the dashboard rearwardly of the latter.

2. In the invention as set forth in claim 1, wherein said legs are pivotally mounted on the bar, and said arms are adjustably extensible.

3. In the invention as set forth in claim 1, wherein each of said posts is swingable relative to the corresponding leg, and said arms are adjustably extensible and engage the posts intermediate the extremities of the latter and intermediate the transverse perimeters of the panel.

4. In the invention as set forth in claim 3, wherein said legs are pivotally mounted on the bar.

References Cited in the file of this patent

UNITED STATES PATENTS

| Number | Name | Date |
| --- | --- | --- |
| 2,322,755 | Voorhies | June 29, 1943 |

FOREIGN PATENTS

| Number | Country | Date |
| --- | --- | --- |
| 311,944 | Italy | Oct. 16, 1933 |
| 582,985 | France | Oct. 24, 1924 |
| 769,903 | France | June 18, 1934 |